United States Patent
Watanabe

(10) Patent No.: US 6,343,191 B1
(45) Date of Patent: Jan. 29, 2002

(54) CAMERA HAVING BOTH SILVER-SALT PICTURE-TAKING FUNCTION AND ELECTRONIC-IMAGE PICKUP FUNCTION

(75) Inventor: Youji Watanabe, Fuchu (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/417,191

(22) Filed: Oct. 12, 1999

(30) Foreign Application Priority Data

Oct. 19, 1998 (JP) .......................................... 10-297064

(51) Int. Cl.[7] ................................................ G03B 7/26
(52) U.S. Cl. ........................ 396/277; 396/303; 396/429; 348/64
(58) Field of Search ................................ 396/277, 279, 396/429, 303; 348/64

(56) References Cited

U.S. PATENT DOCUMENTS 5,966,553 A * 10/1999 Nishitani et al. ............ 396/303
5,978,016 A * 11/1999 Lourette et al. ............... 348/64
6,031,999 A * 2/2000 Ogawa ........................ 396/303

FOREIGN PATENT DOCUMENTS

JP     10-3120     1/1998
JP     10-10632     1/1998

* cited by examiner

Primary Examiner—David M. Gray
(74) Attorney, Agent, or Firm—Frishauf, Holtz, Goodman, Langer & Chick, P.C.

(57) ABSTRACT

The present invention provides a user-friendly camera having a silver-salt picture-taking function and an electronic-image pickup function. The camera includes a silver-salt picture-taking unit and an electronic-image pickup unit. The electronic-image pickup unit picks up an electronic image, which is almost equivalent to a subject image exposed to a silver-salt film, in synchronization with the exposure to the silver-salt film in the silver-salt picture-taking unit. Prior to the exposure, a control circuit causes a battery check circuit to check a power supply battery and causes a determination circuit to determine a result of the battery check while referring to a determination-level storage circuit, thereby properly controlling the silver-salt picture-taking unit and the electronic-image pickup unit so as to prevent the electronic-image pickup unit from performing its pickup operation in the subsequent picture-taking operations.

4 Claims, 6 Drawing Sheets

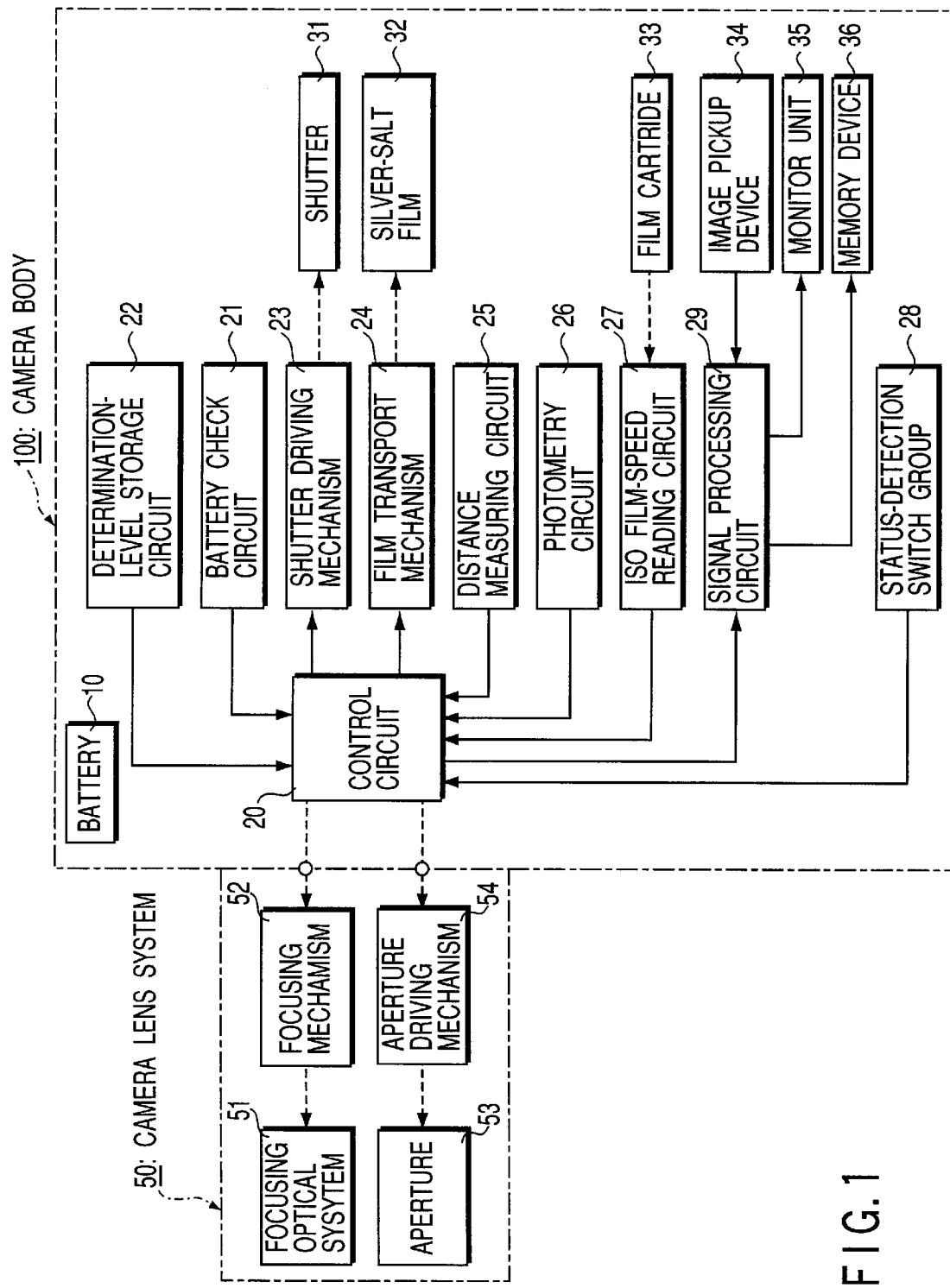
F I G. 1

CAMERA HAVING BOTH SILVER-SALT PICTURE-TAKING FUNCTION AND ELECTRONIC-IMAGE PICKUP FUNCTION

BACKGROUND OF THE INVENTION

The present invention relates to a camera for picking up an electronic image, which is almost equivalent to a subject image exposed to a silver-salt film, in synchronization with the exposure to the silver-salt film.

Various types of camera have been proposed in which an image pickup unit is incorporated into a conventional camera using a silver-salt film to pick up an electronic image which is almost equivalent to a subject image exposed to the silver-salt film. Such a camera generally includes a monitor unit using a liquid crystal display device capable of confirming a picked-up electronic image. This type of camera is referred to as a camera with a monitor.

In a camera using a small-sized battery as a main power supply, the battery is likely to become exhausted shortly because both an image pickup unit and a monitor unit of the camera consume high power. A photographer therefore feels it unpleasant that these additional confirmation functions stop a picture-taking operation from being performed. It is thus difficult for a user to use this type of camera.

Accordingly, the object of the present invention is to provide a user-friendly camera having both a silver-salt picture-taking function and an electronic-image pickup function.

BRIEF SUMMARY OF THE INVENTION

In order to attain the above object, according to a first aspect of the present invention, there is provided a camera for picking up an electronic image, which is almost equivalent to a subject image exposed to a silver-salt film, in synchronization with the exposure to the silver-salt film, wherein prior to the exposure, a power supply battery is checked and, based on a result of the battery check, the electronic-image pickup operation is inhibited in the subsequent picture-taking operations.

According to a second aspect of the present invention, there is provided a camera for picking up an electronic image, which is almost equivalent to a subject image exposed to a silver-salt film, in synchronization with the exposure to the silver-salt film, and displaying the electronic image on a monitor unit, wherein prior to the exposure, a power supply battery is checked and, based on a result of the battery check, at least one of the electronic-image pickup operation and the electronic-image display operation is permitted or inhibited in the subsequent picture-taking operation.

After at least one of the electronic-image pickup and display operations is inhibited, this inhibit state is continued until the camera is reset.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the whole structure of a single-lens reflex camera system to which the present invention is applied;

DETAILED DESCRIPTION OF THE INVENTION

Figure 2:
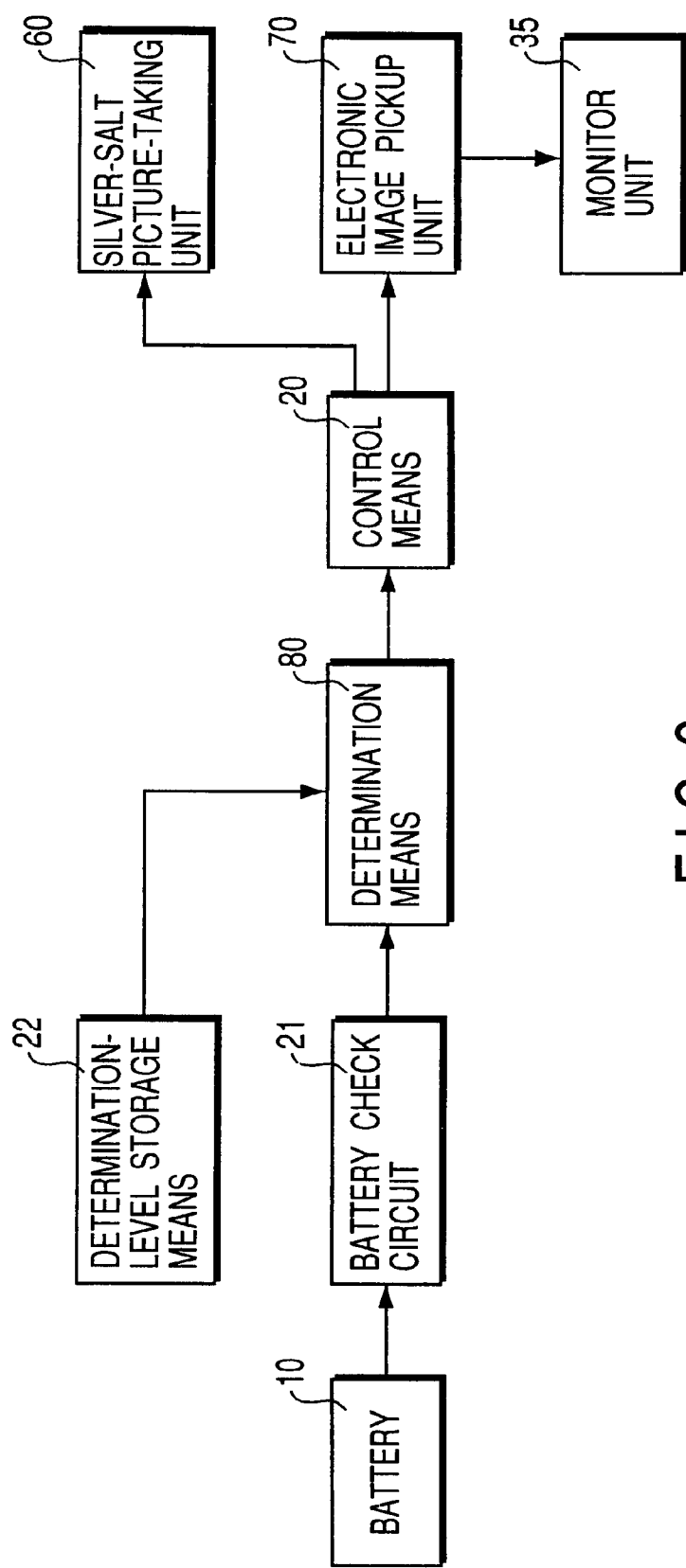
FIG. 2 is a block diagram showing the main parts of a camera of the present invention as hardware constituting elements.

An embodiment of the present invention and its modification will now be described in detail with reference to the accompanying drawings.

FIG. 1 is a block diagram showing the whole structure of a single-lens reflex camera system to which the present invention is applied. As is seen from FIG. 1, the camera system is constituted chiefly of a camera body 100 and a camera lens 50 connected to the camera body 100.

The camera body 100 includes a single power supply battery 10 for supplying power to all electric circuits of the camera body 100 and camera lens 50. In other words, the power supply battery 10 is the only one power supply in this camera system.

The camera body 100 includes a control circuit 20 for performing a sequence of the overall camera system. The control circuit 20 is connected to a battery check circuit 21 for checking the battery (for measuring a voltage of the power supply battery), a determination-level storage circuit 22 for storing a determination level to determine a measurement result of the battery check circuit 21, a shutter driving mechanism 23 for driving a shutter 31 to expose a subject image to a silver-salt film 32, a film transport mechanism 24 for advancing/taking up the silver-salt film, a distance-measuring circuit 25 for detecting an amount of defocus of a focusing optical system 51 by a known phase-difference method, a photometry circuit 26 for measuring the luminance of a subject, an ISO film-speed reading circuit 27 for reading film-speed information by a DX code given to a silver-salt film cartridge 33, a status-detection switch group 28 including various switches (first and second switches SW, a main switch, etc.) associated with various operation members (a release button, a main operation member, etc., not shown) provided on the outer surface of the camera body 100, and a signal processing circuit 29 for converting a subject image, which is picked up by an image pickup device 34 such as a CCD, into digital image data and then causing the data to be displayed on a monitor unit 35 or to be stored in a memory device 36.

In synchronization with an operation of the shutter 31, the signal processing circuit 29 converts an output signal of the image pickup device 34 into digital image data, and displays it on the monitor unit 35 or stores it in the memory device 36. The monitor unit 35 includes a liquid crystal display device, a driving circuit and a backlight unit. The memory device 36 is a nonvolatile memory such as an EEPROM and, favorably, it should be detached from the camera body 100.

The status-detection switch group 28 includes switches other than the first and second switches SW and the main switch which are associated with the release button. The determination-level storage circuit 22 has only to be a rewritable nonvolatile memory such as an EEPROM which is capable of temporarily storing a determination level for battery check and then reading it therefrom.

The distance-measuring circuit 25 has a "phase-difference type AF" function of automatically detecting an amount of defocus of the focusing optical system 51. The ISO film-speed reading circuit 27 includes a mechanism for optically and magnetically reading DX information of the silver-salt film cartridge 33.

The camera lens 50 can be mechanically and electrically attached to the camera body 100, and includes a focusing mechanism 52 for driving the focusing optical system 51 and an aperture driving mechanism 54 for driving an aperture 53. These mechanisms 52 and 54 perform their optimum operations in response to a given control signal from the control circuit 20 in the camera body 100.

FIG. 2 is a block diagram illustrating the main parts of a camera of the present invention as hardware constituting elements. The camera includes a silver-salt picture-taking unit 60 for forming an image on a silver-salt film 32, an electronic-image pickup unit 70 for picking up an electronic image, which is almost equivalent to the image formed on the silver-salt film 32, in synchronization with the picture-taking operation of the silver-salt picture-taking unit 60, and a monitor unit 35 for displaying the electronic image picked up by the electronic-image pickup unit 70. The operations of these units are controlled by a control means 20. The unit 70 picks up an electronic image, which is almost equivalent to a silver-salt photograph, in synchronization with the picture-taking operation of the unit 60.

In the camera so constituted, prior to the above exposure operation, the control circuit 20 causes a battery check circuit 21 to check a power supply battery 10, causes a determination means 80 to determine a result of the battery check while referring to a determination-level storage means 22, and controls the silver-salt picture-taking unit 60 and electronic-image pickup unit 70 so as to prevent an electronic image from being picked up in subsequent image pickup operations.

If the battery check level of the battery is set to the following three levels: 1) capable of both the picture-taking operation and the image display operation; 2) capable of only the picture-taking operation; and 3) incapable of both the picture-taking and image display operations. At the levels 2) and 3), an image is inhibited from being formed on the monitor unit and this status is maintained until the battery is exchanged with another. More specifically, the determination-level storage means 22 stores two determination levels V2 and V1 (V2>V1) for battery check. V1 represents a level for determining whether a picture can be taken or not and, if a value is lower than V1, the subsequent picture-taking operations cannot be secured. V2 represents a level for determining whether an image can be displayed on the monitor unit or whether a picture can be taken or not. If a value is not lower than V2, both the picture-taking and display (or image pickup) operations can be carried out. These levels V1 and V2 are stored in advance in an EEPROM in the assembly line of the camera. The silver-salt picture-taking unit 60 corresponds to an operation mechanism of a conventional silver-salt camera.

To be more specific, the battery check circuit 21 is a circuit for AD-converting a voltage of the battery 10 when it causes current to flow from the battery 10 to a dummy load (e.g., a resistor). An open-circuit voltage can be measured, without using any dummy load, depending upon the type of battery.

The AD-converted voltage is applied to the determination means 80. The means 80 compares the voltage with two determination levels V1 and V2 (V2>V1) stored in the determination-level storage means 22 and supplies the control means 20 with a comparison result that the voltage is not lower than V2, it is lower than V2 and not lower than V1, or it is lower than V1.

The level V2 is a determination level for determining whether all functions of the camera can be fulfilled or not. If it is therefore determined that the voltage is not lower than V2, the remaining battery is enough. On the other hand, the level V1 is a determination level for determining whether the minimum picture-taking operation can be performed or not. If it is determined that the voltage is lower than V1, it is predicted that the battery voltage will decrease too much during the next picture-taking operation and the camera will stop abnormally. Since, in this case, it is more important to prevent incapability of silver-salt photography as much as possible, at least one of the picture-taking operation and the display operation has only to be stopped in order to reduce current consumption to the most.

In the camera illustrated in FIG. 2, the control means 20 supplies a given control signal to the silver-salt picture-taking unit 60 and the electronic-image pickup unit 70. If the measured voltage is not lower than V2, the control means 20 transmits an operation permit signal to both the units 60 and 70. If the voltage is lower than V2 and not lower than V1, the means 20 permits the silver-salt picture-taking unit 60 to perform a normal operation but inhibits the electronic-image pickup unit 70 from performing an image pickup operation and a display operation. The image pickup operation can be continued and only the display operation can be inhibited. If the voltage is lower than V1, the subsequent camera operations are all inhibited. These inhibit operations are carried out by setting a picture-taking inhibit flag and a display inhibit flag. The picture-taking inhibit flag is set when it is predicted from a result of battery check that the subsequent picture-taking operations cannot be performed. The display inhibit flag is set when it is predicted that the subsequent display operations cannot be performed or the picture-taking operation cannot be performed if the display operation is continued.

The battery check circuit 21 AD-converts a voltage of the battery when it causes current to flow through a dummy load. An open-circuit voltage of the battery can be measured without using any dummy load.

The determination means 80 determines that the measured voltage is not lower than V2, it is lower than V2 and not lower than V1, or it is lower than V1. If the voltage is not higher than V1, it is insufficient for performing a series of picture-taking operations, in other words, it is predicted that a picture-taking operation is impossible.

If a display operation is permitted to continue when the battery becomes weak, silver-salt photography itself is likely to become impossible. Therefore, the control means 20 supplies the following control signals to the silver-salt picture-taking unit 60 and electronic-image pickup unit 70 in accordance with a voltage-level determination result of the above battery check.

1) a permit signal for permitting both a silver-salt picture-taking operation and a display operation (or an image pickup operation);

2) an inhibit signal for inhibiting a display operation (or an image pickup operation)

3) an inhibit signal for inhibiting both a silver-salt picture-taking operation and a display operation The foregoing determination levels are derived from the experiment on the design phase and can be stored in the determination-level storage means (corresponding to the determination-level storage circuit 22 in FIG. 1) during the camera assembly.

Figure 3:
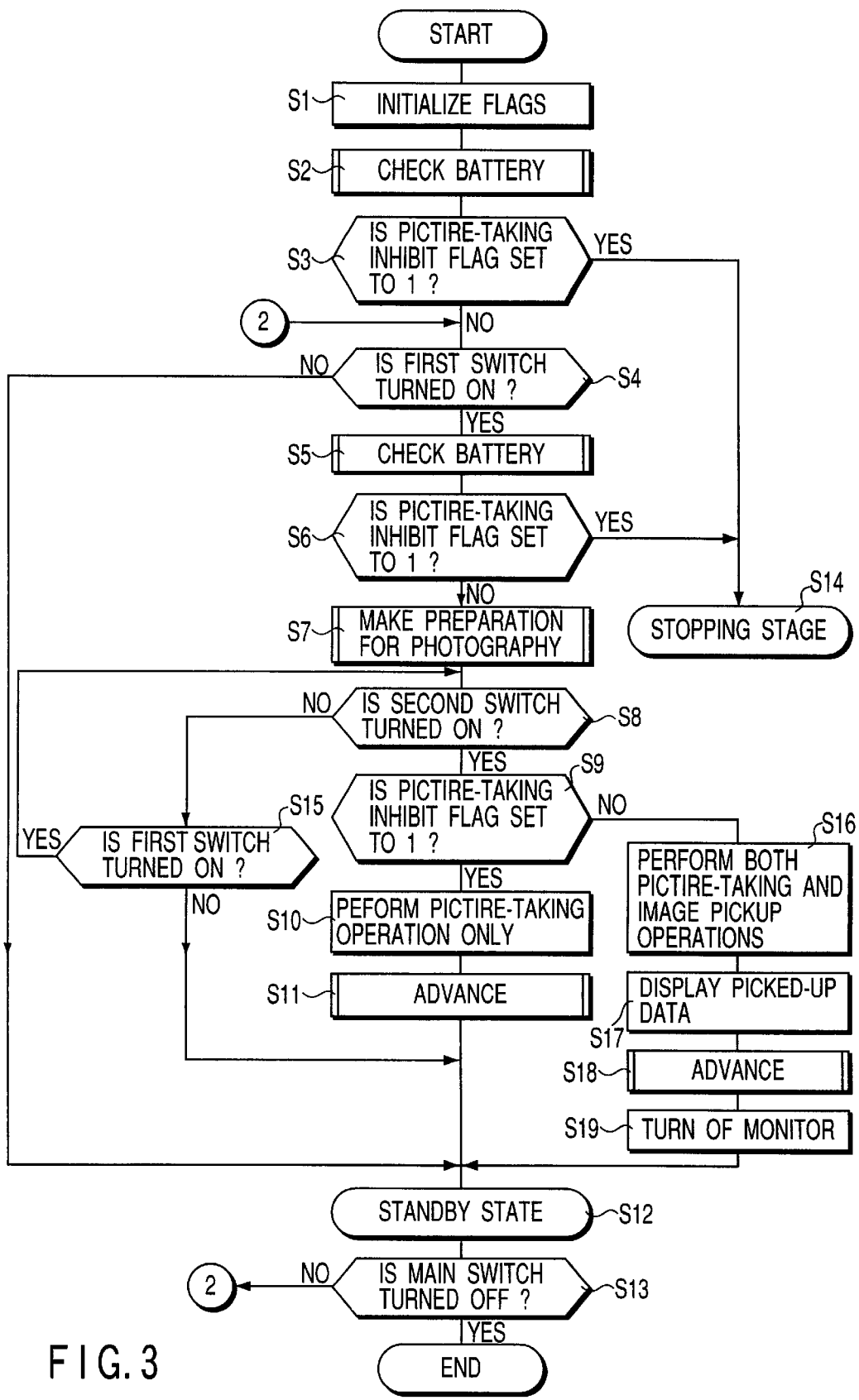
FIG. 3 is a main flowchart of an operation of a control circuit of the camera system shown in FIG. 1.
Figure 4:
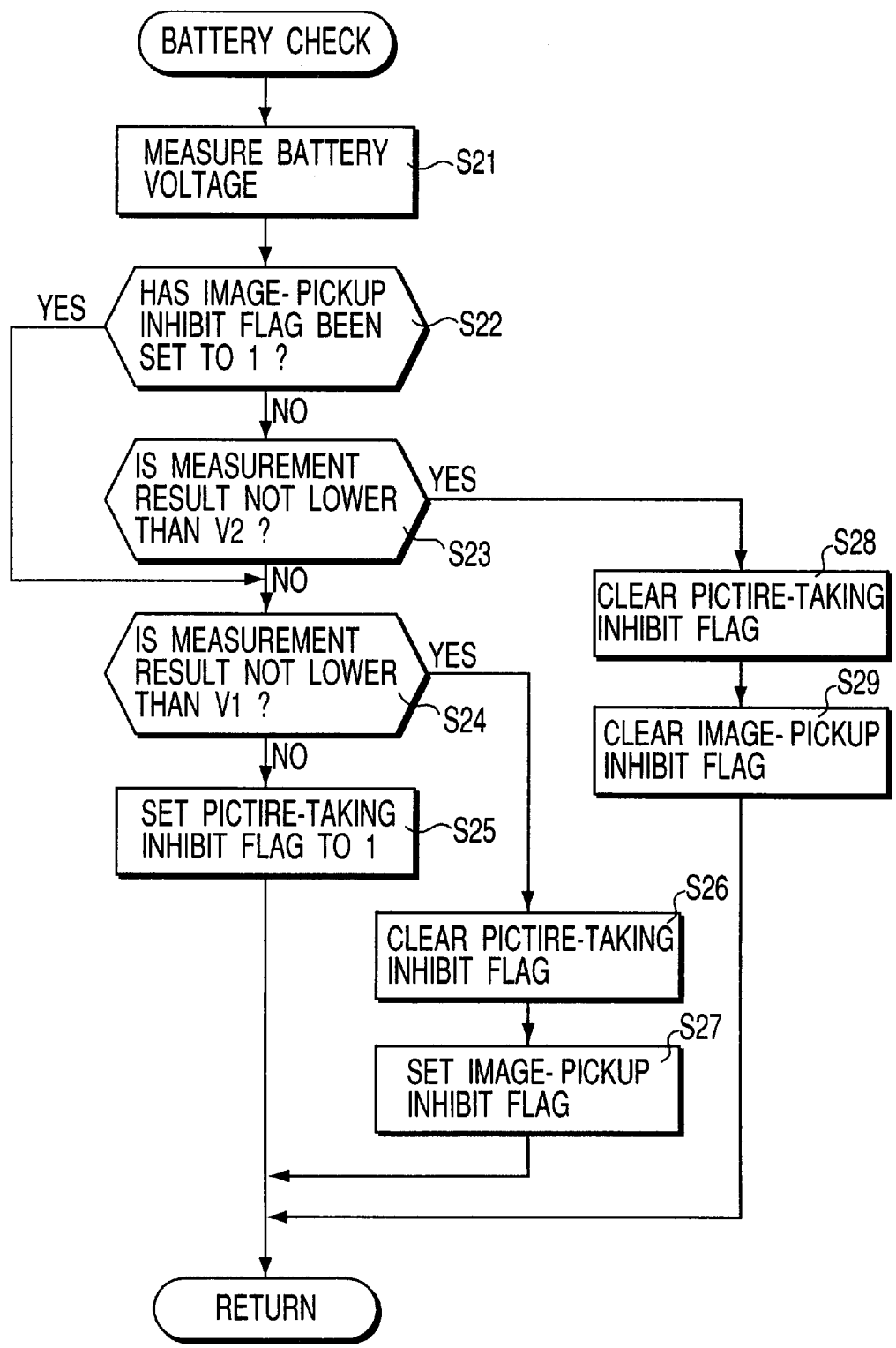
FIG. 4 is a subroutine flowchart called from the main flowchart of FIG. 3.

FIGS. 3 and 4 are flowcharts of procedures for operating the control circuit 20 shown in FIG. 1. Of these figures, FIG. 3 shows a main routine of the control circuit 20, and FIG. 4 illustrates a subroutine "battery check" called from the main routine.

If a main switch (not shown) mounted on the outer surface of the camera is turned on, the control circuit 20 starts its operation. In step S1, the flags are initialized and all the setting about the old battery check is cleared.

In step S2, a subroutine of battery check is executed. The battery check is a subroutine for carrying out the battery check operation. This operation will be described in detail with reference to FIG. 4. In step S21, the battery voltage is AD-converted when current is caused to flow through the dummy load.

In step S22, it is determined whether the image-pickup inhibit flag has been set to 1. This flag is set to 1 when it is predicted from a result of battery check that the picture-taking operation cannot be performed unless the image pickup operation is inhibited. The fact the flag has been set to 1 means that the voltage measured in the old battery check operation is lower than V2 and not lower than V1. If it is set to 1, the flow skips step S23 and moves to step S24. If not, the flow advances to step S23.

In step S23, it is determined whether the measured voltage is not lower than V2. If it is not lower than V2, the picture-taking inhibit flag is cleared in step S28. The picture-taking inhibit flag is set when it is predicted from a result of battery check that the camera is stopped abnormally during the picture-taking operation.

Subsequently, the image-pickup inhibit flag is cleared in step S29, and the flow returns to the main routine in FIG. 3.

If, in step S23, the measured voltage is lower than V2, the flow moves to step S24, in which it is determined whether the measured voltage is not lower than V1. If it is not lower than V1, the picture-taking operation is permitted but the image-pickup operation is inhibited; therefore, the picture-taking inhibit flag is cleared to 0 in step S26 and the image-pickup inhibit flag is set in step S27. The flow then returns to the main routine.

If, in step S24, the measured voltage is lower than V1, it is predicted that the subsequent picture-taking operations cannot be performed. Thus, the picture-taking inhibit flag is set to 1 in step S25, and the flow returns to the main routine.

The reason why the flow skips step S23 when the image-pickup inhibit flag has been set to 1 in step S22, is as follows. In general, a battery has properties of recovering a voltage level when it is not used for a while. Consequently, even though it is determined that the measured voltage is not lower than V1 and lower than V2 by the battery check in certain timing, it can be thought that the voltage is recovered to V2 or higher in the next timing. If the image-pickup inhibit or permit operation is set for every battery check, the monitor is turned on and turned off when the battery voltage varies near V2 and it is very hard for a photographer to see the monitor. Therefore, once the camera of the present invention determines that the image-pickup operation should be inhibited, it maintains the inhibit state until the camera is reset (e.g., a change of the main switch from Off to ON and an exchange of batteries). In other words, once the image-pickup inhibit flag is set to 1, it is not cleared to 0 unless the operation is carried out again from the START of the main program routine.

Returning again to the main routine in FIG. 3, a result of battery check is determined in step S3. If the picture-taking inhibit flag is set to 1, the subsequent operation itself cannot be performed. Thus, the flow moves to step S14 and the operation is stopped.

If the picture-taking inhibit flag is not set to 1, it is checked in step S4 whether a first switch SW associated with a half depression of the release button is turned on. If it is not turned on, the flow advances to the "standby state" in step S12, which will be described later.

When it is determined in step S4 that the first switch SW is turned on, the subroutine of "battery check" is executed again in step S5.

Next, the picture-taking inhibit flag is rechecked in step S6. If it is not set to 1, the flow moves to step S7 to perform a "picture-taking preparation" subroutine. This subroutine includes a photometry operation, an exposure calculation operation, a distance-measuring operation, and a focusing operation. Since these operations are known, their detail descriptions are omitted.

After the picture-taking preparation is completed, it is checked in step S8 whether the second switch SW associated with a sufficient depression of the release button is turned on. If it is not turned on, the status of the first switch SW is checked in step S15. If the first switch SW remains in the ON-state, the flow returns to step S8. If, however, neither of the first and second switches is turned on, a user moves his or her hand off the release button and thus the flow advances to the standby state in step S12.

If it is detected in step S8 that the second switch SW is turned on, it is checked in step S9 whether the image-pickup inhibit flag is set or not. If the image-pickup inhibit flag is not set, the battery remains sufficiently. Therefore, the flow moves to step S16, and an image-pickup operation (including a storage operation in the memory device) is performed in synchronization with the picture-taking operation for a silver-salt film. In step S17, the picked-up electronic image data is output and displayed on the monitor unit.

After that, an operation for advancing one frame of the silver-salt film is carried out in the "advance" subroutine in step S18, and the monitor unit is turned off in step S19. The flow then moves to next step S12. In other words, the electronic image is displayed on the monitor unit only during the advance operation.

If it is determined in step S9 that the image-pickup inhibit flag is set, only the picture-taking operation is carried out in step S10. After the "advance" subroutine is executed in step S11, the flow moves to step S12.

The step S12 is a standby state in which the camera is set in an energy-saving mode in order to suppress undesired power consumption and only the change of the main switch or the first switch SW is checked. When a change in the switching state is detected, the energy-saving mode is released and the camera is set in the normal operation state.

After that, the state of the main switch SW is checked in step S13. If the switch is turned off, the camera stops to operate. If it is not turned off, the operation is returned to step S4 by a change of the first switch SW and starts to operate from step S4.

As described above, the current level is determined based on the three battery check levels, and the camera can easily be used in the energy-saving mode capable of preventing the battery from being undesirably consumed by properly controlling both the picture-taking operation and the display operation. (Modification)

In the foregoing embodiment, both the image-pickup operation and the display operation are inhibited when the battery voltage is lowered. In the modification, however, only the display operation can be inhibited while the image-pickup operation is performed. Since, in this case, image-pickup data is stored in the memory device, it can be displayed again on the monitor unit if the battery is exchanged with a new one.

Figure 6:
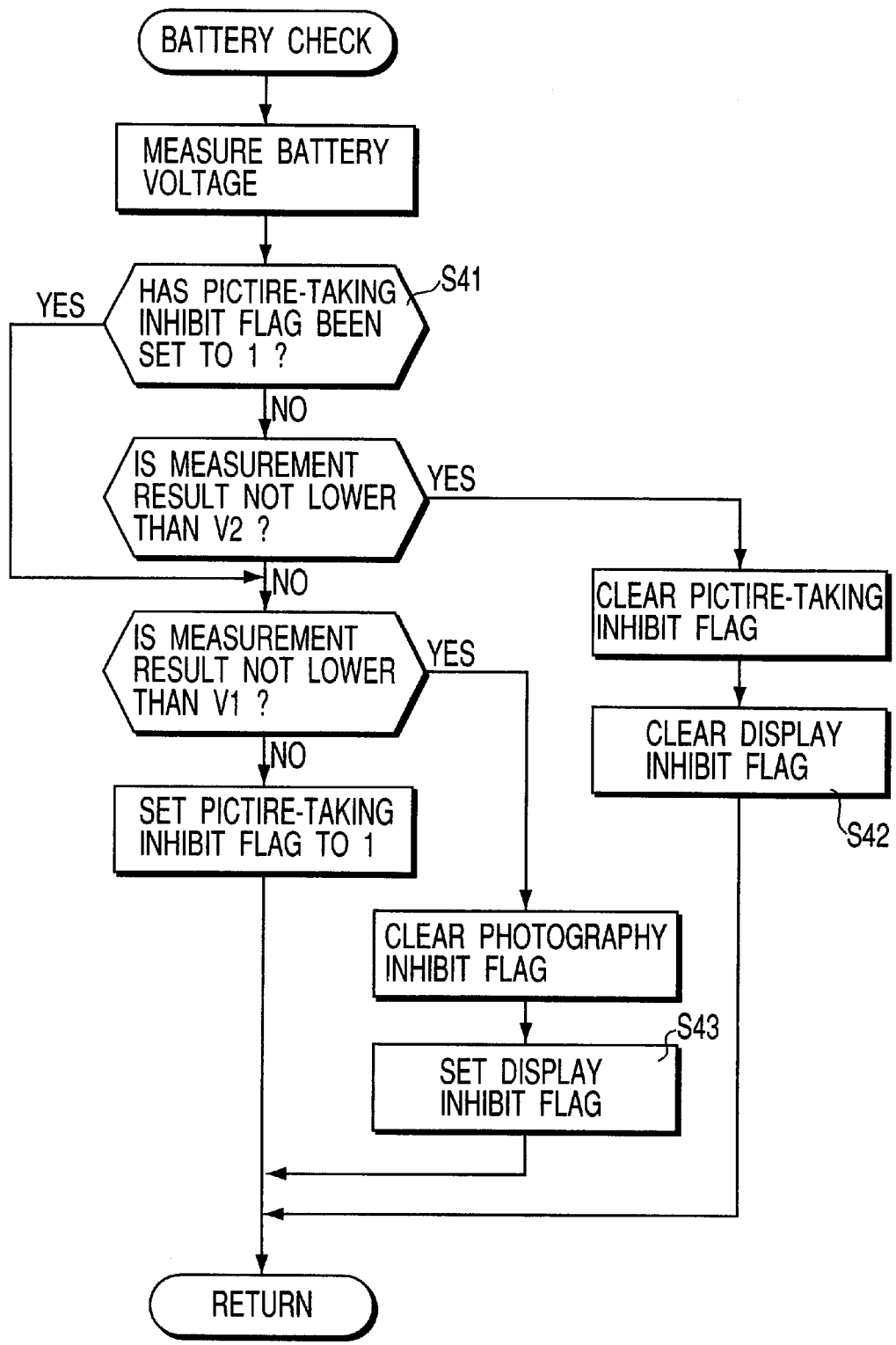
FIG. 6 is a subroutine flowchart called from the main flowchart of FIG. 5 which corresponds to that of FIG. 4.

A "battery check" subroutine in the modification is shown in FIG. 6. This subroutine differs from that in FIG. 4 chiefly in that a display inhibit flag is set in place of the image-pickup inhibit flag. In other words, the steps S22, S29 and S27 of the image-pickup inhibit flag in the flowchart shown in FIG. 4 are replaced with the steps S41, S42 and S43 of the display inhibit flag in the flowchart shown in FIG. 6.

Figure 5:
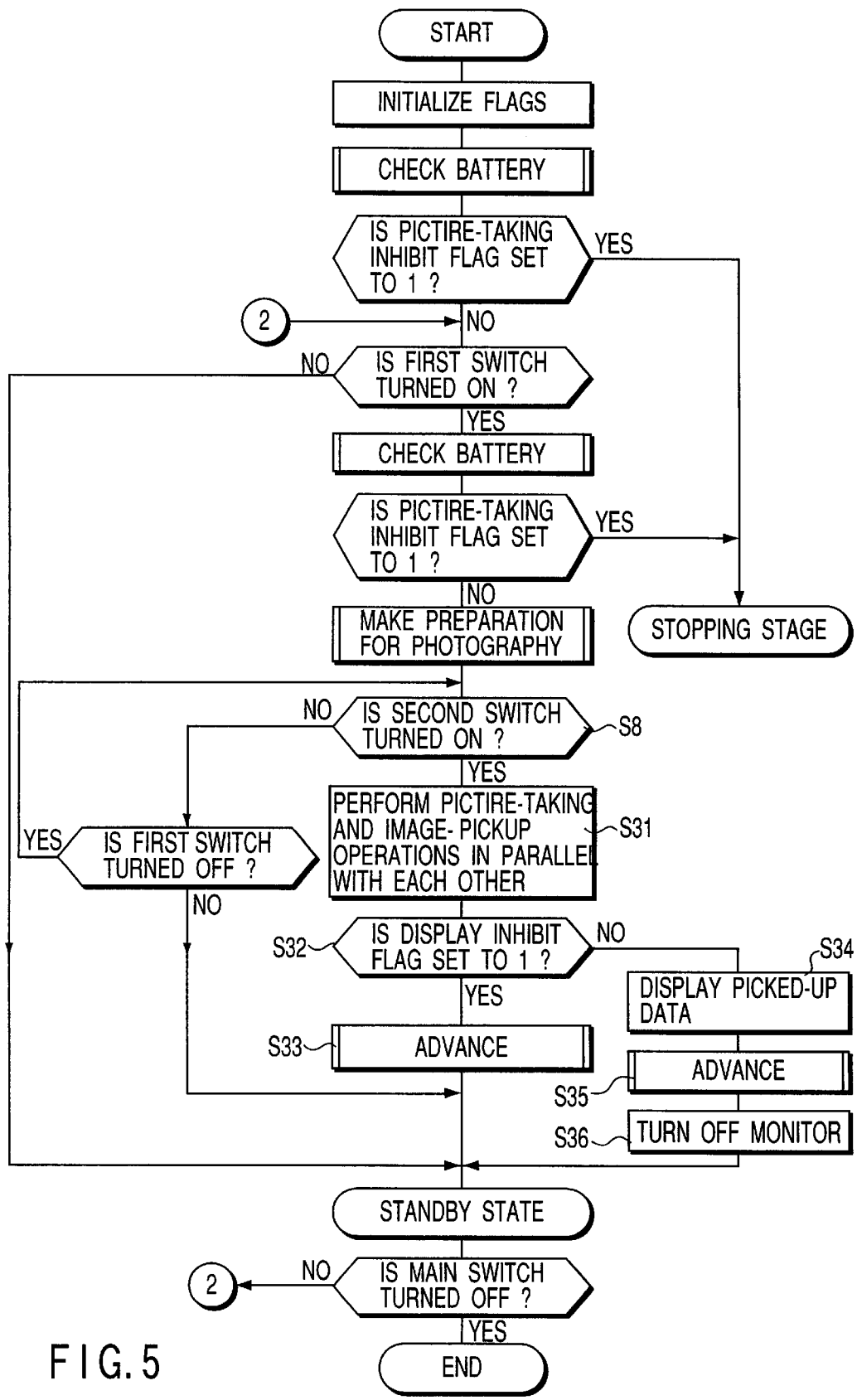
FIG. 5 is a main flowchart of an operation of a modification to the control circuit shown in FIG. 3.

FIG. 5 is a flowchart of the main routine as one modification to that of FIG. 3. If, in step S8, it is determined that the second switch SW is turned on, both the picture-taking and image-pickup operations are performed in parallel with each other in step S31. If the display inhibit flag is not set to 1 in step S32, the display operation is performed in step S34. If the flag is set to 1, the display operation is not done.

This modification is directed to the following. If, in the "battery check" subroutine, a given example such as a "monitor display inhibit" message is displayed, this state is temporarily stored in a memory, and the display is not permitted even though the battery voltage is recovered. This aims at preventing a monitor screen from turning off immediately after it is turned on, and the contents of the memory are set such that they are cleared immediately after the power on reset.

Consequently, a practical, user-friendly camera with a monitor can be provided which causes no blink on the monitor screen and prevents the battery from being undesirably consumed.

In addition to the above embodiment and its modification, the present invention contains the following features. The camera of the present invention is set to three ranges of battery check levels. The first range is capable of the picture-taking operation and the monitor display operation, the second range is capable of only the picture-taking operation, and the third range is incapable of both the picture-taking and monitor display operations. If the level falls within the second and third ranges, the camera is so controlled that the monitor display is inhibited and this state is maintained until the battery is exchanged.

Furthermore, when the camera is set in the "monitor display inhibit" state by the battery check, this state is temporarily stored in the memory and this display is not permitted again even though the battery voltage is recovered.

According to the present invention described above, there can be provided a user-friendly camera with a monitor which has both a silver-salt picture-taking function and an electronic-image pickup function without increasing in size or cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera having a silver-salt picture-taking function and an electronic-image pickup function, the camera comprising:

silver-salt picture-taking means for exposing a subject image on a silver-salt film;

electronic image means for picking up the subject image to form an electronic image, and for displaying the electronic image on a monitor screen;

a power supply battery common to the silver-salt picture-taking means and the electronic image means;

comparison means for comparing a remaining amount of the power supply battery with a preset determination level; and control means for permitting both the silver-salt picture-taking means and the electronic image means to be is operated when the comparison means determines that the remaining amount of the power supply battery is not smaller than the determination level, and for restricting at least part of an operation of the electronic image means when the comparison means determines that the remaining amount is smaller than the determination level;

wherein the control means continues to restrict the operation of the electronic image means even though the remaining amount of the power supply battery becomes not lower than the determination level after the control means restricts the operation of the electronic image means.

2. A camera having a silver-salt picture-taking function and an electronic-image pickup function, the camera comprising:

silver-salt picture-taking means for exposing a subject image on a silver-salt film;

electronic image means for picking up the subject image to form an electronic image, and for displaying the electronic image on a monitor screen;

a power supply battery common to the silver-salt picture-taking means and the electronic image means;

comparison means for comparing a remaining amount of the power supply battery with a preset determination level; and control means for permitting both the silver-salt picture-taking means and the electronic image means to be operated when the comparison means determines that the remaining amount of the power supply battery is not smaller than the determination level, and for restricting at least part of an operation of the electronic image means when the comparison means determines that the remaining amount is smaller than the determination level;

wherein the control means continues to restrict the operation of the electronic image means until the power supply battery is exchanged after the control means restricts the operation of the electronic image means.

3. A camera having a silver-salt picture-taking function and an electronic-image pickup function, the camera comprising:

silver-salt picture-taking means for exposing a subject image on a silver-salt film;

electronic image means for picking up the subject image to form an electronic image, and for displaying the electronic image on a monitor screen;

a power supply battery common to the silver-salt picture-taking means and the electronic image means;

comparison means for comparing a remaining amount of the power supply battery with a preset determination level; and control means for permitting both the silver-salt picture-taking means and the electronic image means to be operated when the comparison means determines that the remaining amount of the power supply battery is not smaller than the determination level, and for restricting at least part of an operation of the electronic image means when the comparison means determines that the remaining amount is smaller than the determination level;

wherein the control means continues to restrict the operation of the electronic image means from a time when a main switch of the camera is turned off until the main switch of the camera is turned on again after the control means restricts the operation of the electronic image means.

4. A camera having a silver-salt picture-taking function and an electronic-image pickup function, the camera comprising:

a plurality of picture-taking units;

a power supply battery common to the plurality of picture-taking units;

a determination circuit for measuring a remaining amount level of the power supply battery to determine whether all of the plurality of picture-taking units can be operated and whether some of the plurality of picture-taking units can be operated;

a determination result storage circuit for storing a determination result of the determination circuit;

a control circuit for selectively activating the plurality of picture-taking units in accordance with a content stored in the determination result storage circuit; and an initialization circuit for clearing the content stored in the determination result storage circuit in response to an operation of an initialization switch.

* * * * *